United States Patent
Song et al.

(10) Patent No.: US 10,882,277 B2
(45) Date of Patent: Jan. 5, 2021

(54) PROTECTIVE COMPOSITE STEEL PLATE AND METHOD FOR MANUFACTURING SAME

(71) Applicant: BAOSHAN IRON & STEEL CO., LTD., Shanghai (CN)

(72) Inventors: Fengming Song, Shanghai (CN); Donghui Wen, Shanghai (CN); Xiaoping Hu, Shanghai (CN)

(73) Assignee: Baoshan Iron & Steel Co., Ltd.d, Beijing (CN)

( * ) Notice: Subject to any disclaimer, the term of this patent is extended or adjusted under 35 U.S.C. 154(b) by 0 days.

(21) Appl. No.: 16/096,125

(22) PCT Filed: Apr. 26, 2017

(86) PCT No.: PCT/CN2017/081953
§ 371 (c)(1),
(2) Date: Oct. 24, 2018

(87) PCT Pub. No.: WO2017/186113
PCT Pub. Date: Nov. 2, 2017

(65) Prior Publication Data
US 2019/0134948 A1    May 9, 2019

(30) Foreign Application Priority Data
Apr. 26, 2016    (CN) .......................... 2016 1 0265663

(51) Int. Cl.
*B32B 15/00*    (2006.01)
*B32B 15/01*    (2006.01)
(Continued)

(52) U.S. Cl.
CPC .............. *B32B 15/011* (2013.01); *B32B 7/08* (2013.01); *B32B 15/01* (2013.01); *B32B 15/04* (2013.01);
(Continued)

(58) Field of Classification Search
None
See application file for complete search history.

(56) References Cited

U.S. PATENT DOCUMENTS

| | | | |
|---|---|---|---|
| 8,535,813 B2 * | 9/2013 | Becker ................. | B32B 15/011 428/683 |
| 2010/0003540 A1 * | 1/2010 | Koseki ..................... | B21B 1/38 428/638 |
| 2015/0030879 A1 * | 1/2015 | Kosaka ................ | C22C 38/001 428/659 |

FOREIGN PATENT DOCUMENTS

| | | | | |
|---|---|---|---|---|
| CN | 101486043 | | 7/2009 | |
| CN | 105088090 A | * | 11/2015 | ............. C22C 38/44 |

(Continued)

OTHER PUBLICATIONS

P. Zhao et al., General Relationship Between Strength and Hardness, Sep. 8, 2011, Materials Science and Engineering A, vol. 529, p. 62-73. (Year: 2011).*

(Continued)

*Primary Examiner* — Seth Dumbris
*Assistant Examiner* — Kim S. Horger
(74) *Attorney, Agent, or Firm* — Thomas Horstemeyer, LLP (57) ABSTRACT

There is disclosed in the disclosure a protective clad steel plate, comprising hard steel layers (1, 3, 5) and soft steel layers (2, 4) arranged alternately, wherein face layers of the protective clad steel plate are hard steel layers (1, 3, 5), wherein the hard steel layers (1, 3, 5) and soft steel layers (2, 4) are atomically bonded by rolling cladding; wherein the soft steel layers (2, 4) comprise chemical elements in percentage by mass of: C: 0.001-0.01%, 0<Si≤0.005%, Mn: 0.05-0.15%, 0<Al≤0.005%, Ti: 0.01-0.10%, with a balance of Fe and unavoidable impurities.

16 Claims, 3 Drawing Sheets

(51) Int. Cl.
| | |
|---|---|
| *C22C 38/02* | (2006.01) |
| *C22C 38/04* | (2006.01) |
| *C21D 1/18* | (2006.01) |
| *C22C 38/14* | (2006.01) |
| *B32B 7/08* | (2019.01) |
| *C22C 38/08* | (2006.01) |
| *B32B 37/10* | (2006.01) |
| *C22C 38/12* | (2006.01) |
| *B32B 15/04* | (2006.01) |
| *B32B 15/18* | (2006.01) |
| *C21D 6/00* | (2006.01) |
| *C21D 8/02* | (2006.01) |
| *C21D 9/46* | (2006.01) |
| *C22C 38/00* | (2006.01) |
| *C22C 38/06* | (2006.01) |
| *C22C 38/44* | (2006.01) |
| *C22C 38/50* | (2006.01) |
| *C22C 38/54* | (2006.01) |

(52) U.S. Cl.
CPC .............. *B32B 15/18* (2013.01); *B32B 37/10* (2013.01); *C21D 1/18* (2013.01); *C21D 6/004* (2013.01); *C21D 6/005* (2013.01); *C21D 6/008* (2013.01); *C21D 8/0205* (2013.01); *C21D 8/0247* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/44* (2013.01); *C22C 38/50* (2013.01); *C22C 38/54* (2013.01); *B32B 2250/42* (2013.01); *B32B 2571/02* (2013.01); *C21D 2211/005* (2013.01); *C21D 2211/008* (2013.01)

(56) References Cited

FOREIGN PATENT DOCUMENTS

| | | |
|---|---|---|
| CN | 105499296 | 4/2016 |
| DE | 1899245 | 8/1964 |
| DE | 69716518 | 7/2003 |
| EP | 0366646 | 5/1990 |
| EP | 0816524 | 1/1998 |
| JP | H051349 | 1/1993 |
| JP | H0663699 | 3/1994 |
| JP | H06136485 | 5/1994 |
| JP | H11343537 | 12/1999 |
| JP | H11343537 A * | 12/1999 |
| JP | 2002256390 | 9/2002 |
| JP | 2010535292 | 11/2010 |
| JP | 2016505094 | 2/2016 |
| JP | 2018530668 | 10/2018 |
| JP | 2019505687 | 2/2019 |
| RU | 2427781 | 8/2011 |
| WO | 02055952 | 7/2002 |
| WO | WO-2014154106 A1 * 10/2014 ........... C22C 38/001 |

OTHER PUBLICATIONS

Inoue et al., Shape Effect of Ultrafine-grained Structure on Static Fracture Toughness in Low-alloy Steel, Jun. 13, 2012, Science and Technology of Advanced Materials, vol. 13, Issue 035005 (10 pp). (Year: 2012).*

Office Action dated Oct. 29, 2019 for Japanese Patent Application No. 2019-506774.

English translation of the Written Opinion dated Nov. 2, 2017 for PCT Patent Application No. PCT/CN2017/081953.

Office Action dated Jan. 30, 2020 for German Patent Application No. 112017002177 with English Translation.

\* cited by examiner

PROTECTIVE COMPOSITE STEEL PLATE AND METHOD FOR MANUFACTURING SAME

CROSS-REFERENCE TO RELATED APPLICATIONS

This application is a 371 U.S. National Phase of PCT International Application No. PCT/CN2017/081953 filed on Apr. 26, 2017, which claims benefit and priority to Chinese patent application no. 201610265663.5, filed on Apr. 26, 2016. Both of the above-referenced applications are incorporated by reference herein in their entireties.

TECHNICAL FIELD

The present disclosure relates to a steel plate and a method for manufacturing the same, particularly to a clad steel plate and a method for manufacturing the same.

BACKGROUND ART

Protective requirements are imposed on key parts of protective equipment or devices such as amour cash carriers. Particularly, a steel plate needs to endure impact from a high speed impacting object in a certain distance without cracking or penetration. Existing protective materials include individual high-strength protective steel plates, ceramic composites or high molecular fibrous materials. A protective steel plate relies on its high elastic deformation to absorb the impact energy of an impacting object. If its toughness is insufficient (particularly for an ultrahigh-strength steel plate), it's very prone to fragmentation, thereby losing its protective function. A ceramic material is extremely hard, but its toughness is rather poor. When contacting an impacting object, the ceramic material shatters into small fragments, and thus the impact energy is absorbed. The ceramic material generally needs to be used in combination with a high molecular fibrous material which has good toughness. When impacted by an impacting object, the fibrous material absorbs the impact load with elastic deformation. Fibrous materials are mostly used for manufacture of protective vests.

Theoretically, if a steel plate is thick enough, it can be used alone to meet protective requirements under different conditions. However, an excessive thickness increases the weight of the steel plate, sacrifices its mobility and increases energy consumption. Nowadays, protective steel plates are on the way toward higher strength and less thickness.

Chinese patent application No. CN1814845A, published on Jan. 2, 2008 and titled "1000 MPa-GRADE HIGH-STRENGTH HOT-ROLLED BULLET-PROOF STEEL PLATE AND METHOD FOR MANUFACTURING SAME", discloses a 1000 MPa-grade high-strength hot-rolled bullet-proof steel plate comprising, in percentage by weight: C 0.17-0.21%, Si 1.5-2.2%, Mn 1.5-2.0%, P≤0.035%, S≤0.010%, Al 0.015-0.060%, N≤0.0060%, Nb 0.010~0.050%, optional Ti 0.010-0.060%, Ca≤0.0050%, with a balance of Fe and unavoidable impurities. As can be seen from this publication, the yield strength is only 1000 MPa which can hardly meet the protective requirements in the current market.

Chinese patent application No. CN102181795A, published on Sep. 14, 2011 and titled "ULTRAHIGH-STRENGTH BULLET-PROOF STEEL PLATE AND METHOD FOR MANUFACTURING SAME", discloses an ultrahigh-strength bullet-proof steel plate and a process for manufacturing and forming the same. The steel plate has a chemical composition in percentage by weight of C 0.30-0.5, Si 0.40-0.60, Mn 1.50-1.80, P≤0.025, S≤0.01, Cr+Ni+Mo≤2.5, Nb+V+Ti+B≤0.20, with a balance of Fe. The bullet-proof steel plate in this technical solution has a tensile strength of about 2000 MPa. No toughness indicator is mentioned therein, but its hardness value is even higher than 600 HB. This unduly high hardness brings about a decreased toughness to the steel plate which is extremely prone to fragmentation when impacted by an impacting object.

Therefore, there is a need to provide a protective steel plate product having a decreased steel plate thickness and an improved steel plate toughness with the proviso that the strength of the protective steel plate is guaranteed.

SUMMARY

One of the objects of the disclosure is to provide a protective clad steel plate having excellent protective effect by arranging hard steel layers and soft steel layers alternately.

In order to realize the above object, the disclosure proposes a protective clad steel plate, comprising: hard and soft steel layers arranged alternately, wherein face layers of the protective clad steel plate are hard steel layers, wherein the hard steel layer and the soft steel layer are atomically bonded by rolling cladding; wherein the soft steel layer comprises chemical elements in percentage by mass of:

C: 0.001-0.01%, 0<Si≤0.005%, Mn: 0.05-0.15%, 0<Al≤0.005%, Ti: 0.01-0.10%, with a balance of Fe and unavoidable impurities.

In the soft steel layers of the protective clad steel plate according to the disclosure, the unavoidable impurities are mainly P, S, N elements, wherein it may be controlled that P≤0.01%, S≤0.006%, N≤0.005%.

By arranging hard steel layers and soft steel layers alternately in the protective clad steel plate according to the disclosure, the hard steel layers shatter into small fragments when impacted by an impacting object, so as to dissipate impact energy, while the soft steel layers alter the moving direction of the impacting object and impede the advancement of the impacting object, so as to achieve excellent protective effect.

The various chemical elements in the soft steel layers according to the disclosure are designed in accordance with the following principles:

C may increase the yield strength and decrease the elongation rate by solid solution strengthening. The C content should be minimized in light of the steel making process in practice. Therefore, the C content in the soft steel layers according to the disclosure is controlled in the range of 0.001-0.01%.

Si is a deoxygenating element, also a solid solution strengthening element, which increases the yield strength and decreases the elongation rate. Therefore, the amount of Si to be added should be minimized. Hence, the Si content in the soft steel layers according to the disclosure does not exceed 0.005%.

Mn is also a common strengthening element in steel, which increases the yield strength by solid solution strengthening, and decreases the elongation rate. Hence, the Mn content in the soft steel layers according to the disclosure is controlled in the range of 0.05-0.15%.

Al is an element necessary for deoxygenation. However, it may also increase the steel strength. Hence, the Al content in the soft steel layers according to the disclosure is controlled at 0.005% or less.

Ti is used to immobilize C and N atoms to reduce their impedance against dislocation motion. Ti in steel can form TiN→Ti$_4$C$_2$S$_2$→TiS and TiC in order, and thus eliminates free C and N atoms in the steel, thereby decreasing the yield strength. At the same time, TiC and TiN grains, among others, are coarsened and thus lose their grain boundary pinning effect, thereby increasing grain size and decreasing grain boundary strengthening effect. However, excessive Ti will reduce the elongation rate of the protective steel plate. Hence, the Ti content in the soft steel layers according to the disclosure is controlled at 0.01-0.10%.

Further, the matrix structure of the soft steel layers of the protective clad steel plate is equiaxed ferrite.

Still further, the equiaxed ferrite of the protective clad steel plate has a grain size of 40-120 μm.

In this technical solution, owing to the design of extremely low contents of C—Si—Mn components and the use of Ti to immobilize C, N interstitial atoms to eliminate the solid solution strengthening effect of C, N atoms, while providing a relatively large grain size due to coarsening of TiN, TiC particles, the matrix structure of the soft steel layers of the protective clad steel plate is still equiaxed ferrite having a grain size of 40-120 μm even in a quenched state, and the hardness value of the soft steel layers does not exceed 90 Hv even under quenching conditions. Therefore, the soft steel layers have good plasticity.

In this technical solution, the soft steel layers in the protective clad steel plate have a yield strength of 80-180 MPa, a hardness of no more than 90 Hv, and an elongation rate of greater than 40%.

Further, the hard steel layers in the protective clad steel plate according to the disclosure comprise chemical elements in percentage by mass of:

C: 0.40-0.50%, Si: 0.1-0.3%, Mn: 1.0-1.5%, Al: 0.01-0.05%, Cr: 0.1-0.3%, Ni: 0.1-0.3%, Ti: 0.01-0.03%, B: 0.001-0.003%, Mo: 0.05-0.5%, and a balance of Fe and unavoidable impurities.

In the hard steel layers of the protective clad steel plate according to the disclosure, the unavoidable impurities are mainly P, S, N elements, wherein it may be controlled that P≤0.015%, S≤0.006%, N≤0.005%.

In the above technical solution, the various chemical elements in the hard steel layers of the protective clad steel plate are designed in accordance with the following principles:

C is the cheapest strengthening element in steel. However, if C is excessive, a high-temperature steel billet of the protective steel plate tends to crack in the course of cooling, which is undesirable for storage of the steel billet of the protective steel plate and increases production difficulty. Hence, the C content in the hard steel layers according to the disclosure is limited to 0.40-0.50%.

The Si content is controlled at 0.1-0.3%. Si has a relatively high solid solubility in steel. It's able to increase the volume fraction of ferrite in the steel, and refine grains. Hence, it facilitates increase of toughness. However, an unduly high content will degrade weldability.

Mn has a relatively strong solid strengthening effect. At the same time, it reduces the phase change temperature of steel notably, and refines the steel microstructure. It's an important element for strengthening and toughening. However, an unduly high content of Mn will increase hardenability, thereby worsening weldability and the toughness of a welding heat affected zone. Therefore, its content is controlled at 1.0-1.5%.

Al is added as a deoxygenating agent in steel making. At the same time, a trace amount of Al helps to refine grains and improve steel strength and toughness. However, excessive Al will increase ferrite brittleness in steel, leading to decreased steel toughness. Therefore, its content is controlled at 0.01-0.05%.

Cr has a solid solution strengthening effect. However, Cr is a precious alloy element. Hence, the Cr content in the hard steel layers according to the disclosure is limited to 0.1-0.3%.

Ni can not only increase the steel plate strength, but also improve the steel plate toughness. However, Ni is a precious alloy element. Hence, the Ni content in the hard steel layers according to the disclosure is limited to 0.1-0.3%.

0.01-0.03% Ti is added to mainly inhibit growth of austenite grains during reheating of a slab, while inhibiting growth of ferrite grains in recrystallization controlled rolling, thereby increasing the steel toughness.

B has good hardenability. Hence, it can increase the steel plate hardness. However, an unduly high content of B is undesirable for welding. Hence, the B content in the hard steel layers according to the disclosure is limited to 0.001-0.003%.

Mo has good hardenability. Hence, it can increase the steel plate hardness. However, Mo is a precious alloy element. Hence, the Mo content in the hard steel layers according to the disclosure is limited to 0.05-0.5%.

Further, the matrix structure of the hard steel layers of the protective clad steel plate is martensite.

Further, the hard steel layers of the protective clad steel plate have a yield strength of greater than 2000 MPa and a hardness of greater than 600 HBW.

In this technical solution, the hard steel layers of the protective clad steel plate utilize a relatively high C content, and incorporate Mo, B elements to increase hardenability. After heat treatment, the resulting matrix structure is high-strength martensite; the yield strength is greater than 2000 MPa, and the hardness is greater than 600 HBW.

In one embodiment, the protective clad steel plate comprises two hard steel layers positioned as face layers and one soft steel layer positioned between these two hard steel layers. In other words, in this embodiment, the protective clad steel plate has three layers.

Further, the protective clad steel plate comprises at least two soft steel layers. In other words, in this embodiment, the protective clad steel plate has five layers.

In the technical solutions, the protective clad steel plate is assembled according to a sandwich design, wherein a specific number of layers may be determined in accordance with a particular protective requirement.

Further, the protective clad steel plate according to the disclosure has a thickness of 2-20 mm. In comparison with a prior art protective steel plate, the protective clad steel plate according to the disclosure exhibits better protective performance under the same specifications and conditions.

Another object of the disclosure is to provide a method for manufacturing the above protective clad steel plate, which method can be used to produce a protective clad steel plate having excellent properties.

In order to achieve the above inventive object, the disclosure further proposes a method for manufacturing a protective clad steel plate, comprising steps:

(1) assembling hard steel layer billets and soft steel layer billets;
(2) vacuum welding;
(3) clad rolling;
(4) post-rolling air cooling or water cooling;
(5) coiling;

(6) uncoiling, straightening and plate cutting;

(7) quenching-tempering heat treatment.

In this technical solution, due to the existence of oxide layers and greasy dirt on the bonding surfaces of the hard steel layer billets and the soft steel layer billets, its desirable to clean the surfaces of the hard steel layer billets and the soft steel layer billets before assembled. Surface cleaning may be performed using a steel brush or sand belt, or by direct pickling, or in any other manner conceivable to a person skilled in the art.

In this technical solution, the layer numbers of the hard steel layer billets and the soft steel layer billets to be assembled may be determined in light of the specific requirements.

As the protective clad steel plate is prone to oxidation during heating, instead of employing a process of vacuum pumping often used in the prior art, interlayer welding is conducted directly under a vacuum state in a vacuum chamber when the welding is performed around the hard steel layer billets and the soft steel layer billets in the technical solution of the disclosure, such that the production difficulty is reduced, and the oxidation is prevented effectively.

Further, in step (1), a single layer of soft steel layer billet and a single layer of hard steel layer billet have a single-layer thickness ratio of 0.5-0.8, and the total thickness of the soft steel layer billets and the total thickness of the hard steel layer billets have a ratio of 0.15-0.40.

In this technical solution, the thickness ratios of the soft steel layer billets to the hard steel layer billets are designed such that the clad steel plate is fully effective in dissipating energy and altering the moving direction of an invading impacting object, thereby improving the protective effect.

Further, in step (3) of the method for manufacturing a protective clad steel plate, heating is performed at a temperature in the range of 1100-1200° C., wherein a soaking time is 2-3 h, and then the clad rolling is performed with a final rolling temperature being controlled at 850-900° C.

Still further, in step (4) of the method for manufacturing a protective clad steel plate, the post-rolling air cooling or water cooling is performed to arrive at a temperature of 650-750° C.

In this technical solution, the use of water cooling or air cooling after the rolling depends on the thickness of the final product. Generally, air cooling may be employed for a thin steel plate.

Further, in the quenching substep in step (7) of the method for manufacturing a protective clad steel plate, the quenching temperature is at least 50° C. above the Ac3 temperature of the hard steel layers; the soaking time is at least min/mm×the clad steel plate thickness in mm; and then the plate is cooled to room temperature at a rate of ≥50° C./s.

The reason for controlling the quenching temperature to be at least 50° C. above the Ac3 of the hard steel layers, the soaking time to be at least min/mm×the clad steel plate thickness in mm, and then cooling the plate to room temperature at a rate of 50° C./s is that austenization of the structure in the steel matrix begins at the Ac3 temperature or higher, and the higher above the Ac3 temperature, the driving force for austenization is greater, so that austenization is faster, and the soaking time is shorter. However, if the heating temperature for quenching is too high, energy consumption will be increased, leading to increased production cost. Therefore, the quenching temperature is specified to be 50° C. higher than the Ac3 temperature, and the soaking time is 3 times the steel plate thickness.

Still further, in the tempering substep in step (7) of the method for manufacturing a protective clad steel plate, the tempering temperature is 150-230° C., and the soaking time is 15-60 min.

The protective clad steel plate according to the disclosure is tempered at a temperature in the range of 150-230° C. to relieve or eliminate quenching stress, so as to improve the toughness of the protective clad steel plate.

The protective clad steel plate according to the disclosure has the following beneficial effects:

(1) The protective clad steel plate according to the disclosure is designed to have a multi-layer structure comprising alternating soft and hard steel layers, wherein the outer hard steel layers deform, crack or even break away when impacted by an impacting object, and the deformation energy, the crack forming and propagation energy, the interlayer binding energy released when the hard steel layers break away from the inner soft steel layer, and the kinetic energy of leaving fragments are fully absorbed, thereby consuming a part of the kinetic energy of the impacting object, such that the impacting object is no longer able to move forward; and the inner soft steel layer has good plasticity and deformability, so as to alter the moving direction of the impacting object. The inner soft steel layer also increases the penetration thickness of the impacting object, thereby further alleviating the damage caused by the impacting object.

(2) Since the clad steel plate according to the disclosure is a rolled clad steel plate, atomic bonding between the metal layers is achieved at a high temperature, so the interlayer bonding is very strong, and delamination is less likely to occur.

(3) In preferred embodiments of the disclosure, it's required that a single layer of soft steel layer billet and a single layer of hard steel layer billet should have a single-layer thickness ratio of 0.5-0.8, and the total thickness of the soft steel layer billets and the total thickness of the hard steel layer billets should have a ratio of 0.15-0.40, such that the soft steel layer has a thickness that ensures altering the moving direction of an invading impacting object, and lowering the damaging capability and dangerousness of the impacting object, thereby enhancing the protecting capability of the clad steel plate. The thicknesses of the outer hard steel layers may be designed symmetrically to keep the thicknesses of the upper and lower hard steel layers consistent, or asymmetrically so that the upper and lower hard steel layers have different thicknesses to further improve the protective effect.

(4) The intermediate layer soft steel of the disclosure is designed to have extremely low contents of C—Si—Mn components, and the Al content is controlled at a relatively low level along with incorporation of a suitable amount of Ti element, such that the hardness value of the intermediate soft steel layer does not exceed 90 Hv even under quenching conditions.

(5) The layer numbers of the soft and hard steel layers in the protective clad steel plate according to the disclosure can be adjusted flexibly. The specific layer numbers can be determined depending on particular protective requirements. The layer number can be 3 or 5 or even more. Meanwhile, the total thickness can be adjusted to meet protective requirements under different conditions.

(6) The protective clad steel plate according to the disclosure is designed to have alternating soft and hard layers, such that the plasticity of the protective steel plate is improved, and the steel plate acquires better cold roll formability, thereby widening the application field of the protective steel plate.

The method for manufacturing the protective clad steel plate according to the disclosure has the following beneficial effects:

(1) The manufacture method of the disclosure adopts a vacuum welding based peripheral sealing process, exempting a vacuum pumping step conventionally following welding, so that a better sealing effect is achieved.

(2) After the assembling step, the manufacture method of the disclosure adopts a conventional hot rolling process like that for a common steel billet, so that the compatibility of this manufacture process is improved, and the production difficulty and cost are reduced.

It's to be understood that, in some preferred embodiments, the impacting object herein is a bullet or a pill. In some embodiments, the protective effect or protecting capability herein is bullet-proof effect or bullet-proof capability. In some preferred embodiments, the protective steel plate herein is a bullet-proof steel plate.

DETAILED DESCRIPTION

The protective clad steel plate and the manufacture method thereof according to the disclosure will be further explained and illustrated with reference to the accompanying drawings and the specific examples. Nonetheless, the explanation and illustration are not intended to unduly limit the technical solution of the disclosure.

EXAMPLES A1-A6

Table 1 lists the mass percentages of the chemical elements in Examples A1-A6 of the protective clad steel plate.

TABLE 1

| | | (wt %, the balance is Fe and other impurities except for P, S and N) | | | | | | | | | | | |
|---|---|---|---|---|---|---|---|---|---|---|---|---|---|
| Ex. | Steel billet | C | Si | Mn | P | S | Al | N | Ti | Cr | Ni | Mo | B |
| A1 | Hard layer steel | 0.40 | 0.25 | 1.0 | 0.004 | 0.004 | 0.029 | 0.0019 | 0.025 | 0.25 | 0.10 | 0.15 | 0.002 |
| | Soft layer steel | 0.005 | 0.003 | 0.07 | 0.004 | 0.006 | 0.001 | 0.0028 | 0.036 | — | — | — | — |
| A2 | Hard layer steel | 0.41 | 0.15 | 1.1 | 0.008 | 0.004 | 0.032 | 0.0029 | 0.030 | 0.15 | 0.10 | 0.10 | 0.002 |
| | Soft layer steel | 0.002 | 0.005 | 0.12 | 0.006 | 0.003 | 0.003 | 0.0022 | 0.028 | — | — | — | — |
| A3 | Hard layer steel | 0.44 | 0.25 | 1.3 | 0.004 | 0.004 | 0.049 | 0.0019 | 0.025 | 0.25 | 0.20 | 0.35 | 0.0022 |
| | Soft layer steel | 0.005 | 0.003 | 0.06 | 0.004 | 0.003 | 0.001 | 0.0028 | 0.036 | — | — | — | — |
| A4 | Hard layer steel | 0.46 | 0.15 | 1.1 | 0.008 | 0.004 | 0.032 | 0.0029 | 0.030 | 0.15 | 0.24 | 0.30 | 0.0014 |
| | Soft layer steel | 0.002 | 0.005 | 0.12 | 0.006 | 0.003 | 0.003 | 0.0022 | 0.028 | — | — | — | — |
| A5 | Hard layer steel | 0.49 | 0.25 | 1.3 | 0.004 | 0.004 | 0.029 | 0.0019 | 0.030 | 0.25 | 0.30 | 0.45 | 0.0025 |
| | Soft layer steel | 0.005 | 0.003 | 0.07 | 0.004 | 0.006 | 0.001 | 0.0028 | 0.036 | — | — | — | — |
| A6 | Hard layer steel | 0.48 | 0.15 | 1.1 | 0.008 | 0.002 | 0.032 | 0.0029 | 0.030 | 0.27 | 0.29 | 0.48 | 0.002 |
| | Soft layer steel | 0.004 | 0.005 | 0.08 | 0.006 | 0.003 | 0.003 | 0.0022 | 0.028 | — | — | — | — |

Figure 1:
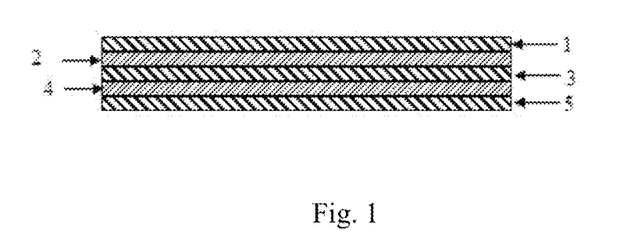
FIG. 1 is a schematic view showing a structure of a protective clad steel plate according to Example A2.

FIG. 1 shows schematically the structure of Example A2 in the disclosure. As can be seen from this figure, in this Example, the protective clad steel plate has five layers comprising two soft steel layers of layer 2 and layer 4, and three hard steel layers of layer 1, layer 3 and layer 5, wherein the hard steel layers and the soft steel layers are arranged alternately.

The protective clad steel plates in the Examples were manufactured with the following steps:

(1) Hard steel layer billets and soft steel layer billets were prepared from the compositions listed in Table 1;

(2) The hard steel layer billets and soft steel layer billets were assembled;

(3) Vacuum welding was performed in a vacuum chamber;

(4) Clad rolling was performed, wherein heating was performed at 1100-1200° C., soaking was performed for 2-3 h, and then clad rolling was performed with a final rolling temperature being controlled at 850-900° C.;

(5) post-rolling air cooling or water cooling to 650-750° C. was performed;

(6) coiling was performed at a temperature of 650-750° C.;

(7) uncoiling, straightening and plate cutting were performed;

(8) quenching-tempering treatment was performed, wherein the quenching temperature was at least 50° C. above the Ac3 temperature of the hard steel layer, the soaking time was at least 3 mm/min×the clad steel plate thickness in mm, and then the plate was cooled to room temperature at a rate of ≥50° C./s; the tempering temperature was 150-230° C., and the temperature was held for 15-60 min.

Table 2 lists the thicknesses and sandwich designs of the hard steel layer billet and soft steel layer billet assembled in Examples A1-A6 of the protective clad steel plate.

TABLE 2

| Ex. | Sandwich design | Steel billet | Thickness/mm | Single-layer thickness ratio of soft steel layer billet to hard steel layer billet | Total thickness ratio of soft steel layer billets to hard steel layer billets |
|---|---|---|---|---|---|
| A1 | Hard + soft + hard | Hard steel layer Soft steel layer | 100 + 100 50 | 0.5 | 0.25 |
| A2 | Hard + soft + hard | Hard steel layer Soft steel layer | 95 + 95 40 | 0.42 | 0.21 |
| A3 | Hard + soft + hard | Hard steel layer Soft steel layer | 100 + 100 80 | 0.8 | 0.4 |
| A4 | Hard + soft + hard + soft + hard | Hard steel layer Soft steel layer | 70 + 70 + 70 40 + 40 | 0.57 | 0.38 |
| A5 | Hard + soft + hard | Hard steel layer Soft steel layer | 80 + 180 40 | 0.5 | 0.154 |
| A6 | Hard + soft + hard + soft + hard | Hard steel layer Soft steel layer | 72 + 72 + 72 42 + 42 | 0.583 | 0.39 |

As can be seen from Table 2, in Examples A1-A6, the single-layer thickness ratio of the soft steel layer billet to the hard steel layer billet is controlled at 0.5-0.8, and the total thickness ratio of the soft steel layer billets to the hard steel layer billets is 0.15-0.40. The sandwich design of the assembly of the protective clad steel plate can be adjusted flexibly. The specific layer number can be determined depending on particular protective requirements. The layer number can be 3 or more. Such a design enables the protective clad steel plate to be fully effective in dissipating energy and redirecting an invading impacting object, so as to improve the protective effect.

Table 3 lists the process parameters of the manufacture method in Examples A1-A6.

TABLE 3

| | Step (4) | | | Step (5) | | | Step (6) | | Step (8) | | | |
|---|---|---|---|---|---|---|---|---|---|---|---|---|
| | | | | Post-rolling | | | | | | | | |
| Ex. | Heating temperature (° C.) | Soaking time (h) | Final rolling temperature (° C.) | Cooling mode | cooling temperature (° C.) | Final product thickness (mm) | Cooling rate (° C./s) | Coiling temperature (° C.) | Ac3 (° C.) | Quenching temperature (° C.) | Soaking time in quenching (min) | Tempering temperature (° C.) | Soaking time in tempering (min) |
| A1 | 1120 | 2 | 880 | Air cooling | 680 | 3 | 80 | 720 | 796 | 850 | 15 | 180 | 20 |
| A2 | 1150 | 2 | 900 | Water cooling | 650 | 3 | 80 | 720 | 788 | 850 | 12 | 160 | 20 |
| A3 | 1100 | 2.5 | 850 | Water cooling | 700 | 6 | 60 | 680 | 795 | 860 | 20 | 180 | 25 |
| A4 | 1180 | 2.4 | 860 | Water cooling | 720 | 6 | 60 | 680 | 785 | 860 | 20 | 210 | 25 |
| A5 | 1190 | 2.8 | 870 | Water cooling | 740 | 12 | 50 | 650 | 789 | 880 | 30 | 230 | 40 |
| A6 | 1200 | 3.0 | 890 | Water cooling | 750 | 12 | 50 | 650 | 787 | 880 | 30 | 230 | 40 |

The mechanical properties of the hard steel layers and soft steel layers in Examples A1-A6 of the protective clad steel plate were measured, and the results were listed in Table 4.

TABLE 4

| Ex. | Steel billet | Hardness | Yield strength/MPa | Elongation rate |
|---|---|---|---|---|
| A1 | Hard steel layer | 642HBW | 2150 | — |
| | Soft steel layer | 78Hv | 144 | 54% |
| A2 | Hard steel layer | 655HBW | 2180 | — |
| | Soft steel layer | 84Hv | 168 | 52% |
| A3 | Hard steel layer | 638HBW | 2100 | — |
| | Soft steel layer | 72Hv | 148 | 48% |
| A4 | Hard steel layer | 635HBW | 2080 | — |
| | Soft steel layer | 84Hv | 175 | 50% |
| A5 | Hard steel layer | 622HBW | 2050 | — |
| | Soft steel layer | 76Hv | 150 | 56% |
| A6 | Hard steel layer | 625HBW | 2070 | — |
| | Soft steel layer | 88Hv | 170 | 58% |

As shown by Table 4, the hard steel layers in Examples A1-A6 all have a yield strength≥2000 MPa and a hardness of greater than 600 HBW, while none of the soft steel layers in Examples A1-A6 have a yield strength of greater than 180 MPa or a hardness value of greater than 90 Hv, and the soft steel layers all have an elongation rate of greater than 40%. Therefore, they have good plasticity.

Figure 2:
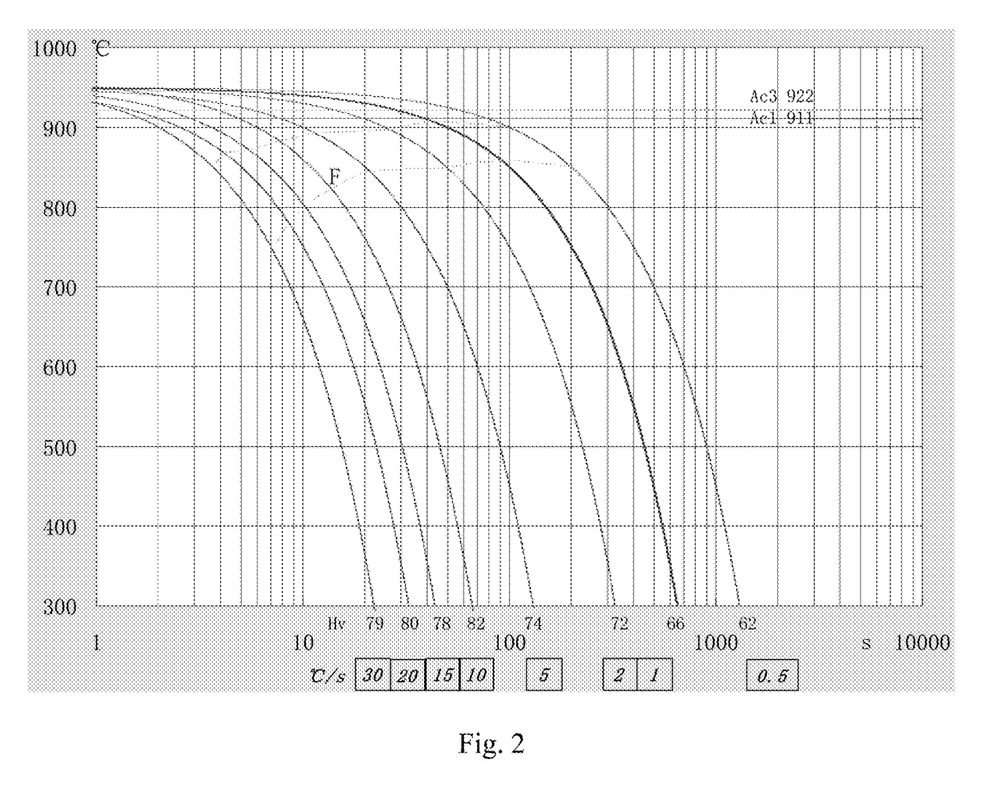
FIG. 2 shows CCT curves (continuous cooling transformation curves) of a soft steel layer for the protective clad steel plate according to the disclosure.

FIG. 2 shows CCT curves of soft steel layers for the protective clad steel plate according to the disclosure. By analysis of these curves, it can be determined that equiaxed ferrite is formed in the soft steel layers in a quenched state.

Figure 3:
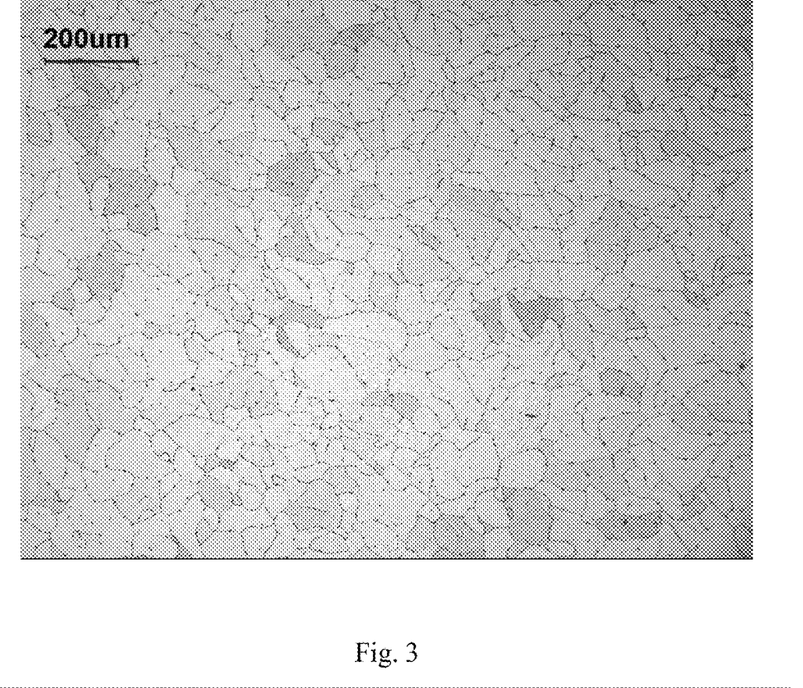
FIG. 3 is an image showing a metallographic structure of a soft steel layer according to Example A1.

FIG. 3 shows the matrix structure of the soft steel layer in Example A1. As can be seen from FIG. 3, the matrix structure of the soft steel layer is equiaxed ferrite.

Figure 4:
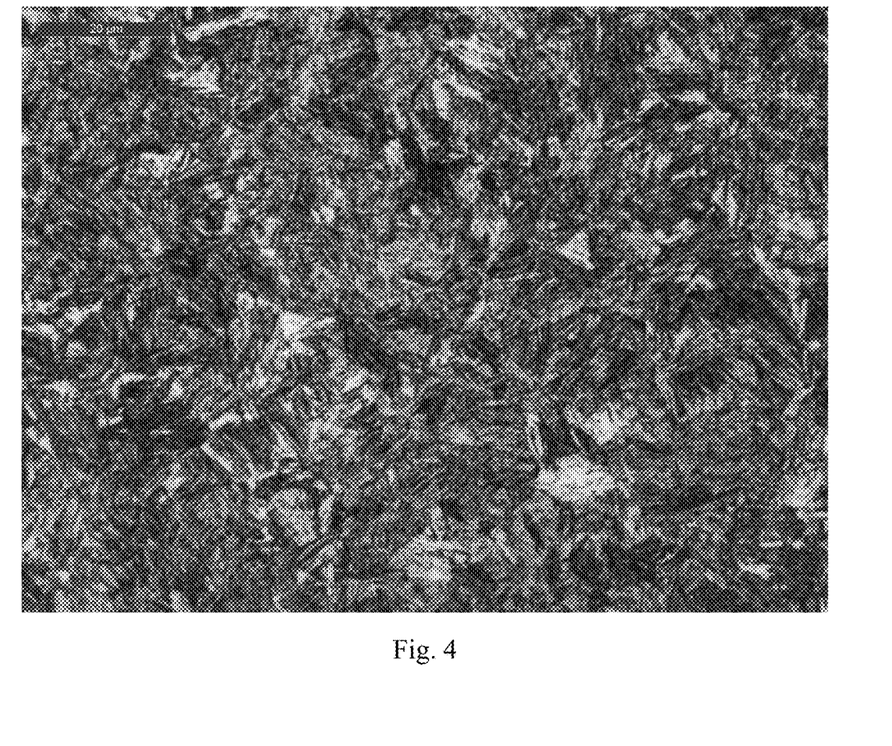
FIG. 4 is an image showing a metallographic structure of a hard steel layer according to Example A1.

FIG. 4 shows the matrix structure of the hard steel layers in Example A1. As can be seen from FIG. 4, the matrix structure of the hard steel layers is mainly martensite.

Figure 5:
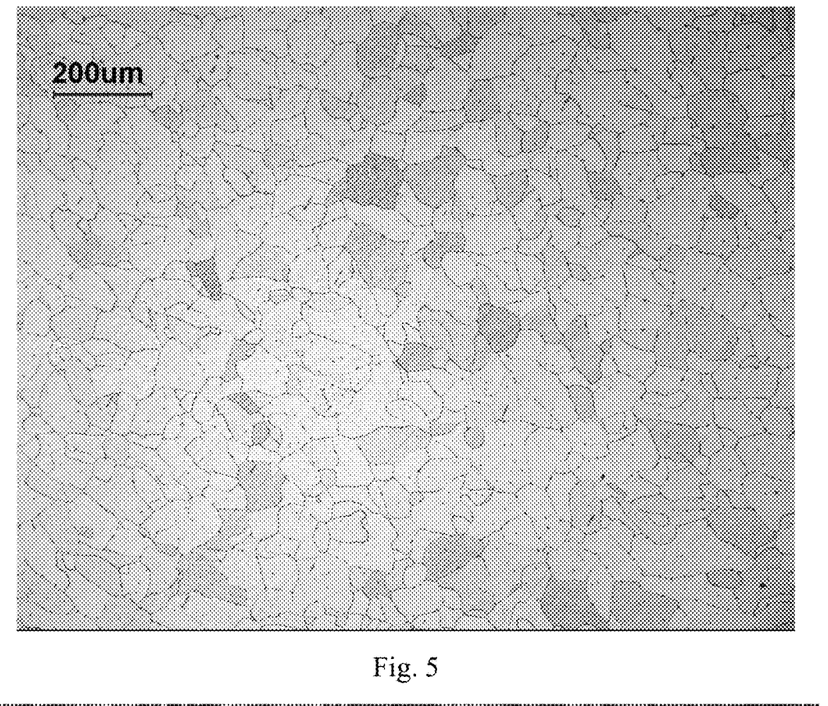
FIG. 5 is an image showing a metallographic structure of a soft steel layer according to Example A2.

FIG. 5 shows the matrix structure of the soft steel layer in Example A2. As can be seen from FIG. 5, the matrix structure of the soft steel layer is equiaxed ferrite.

Figure 6:
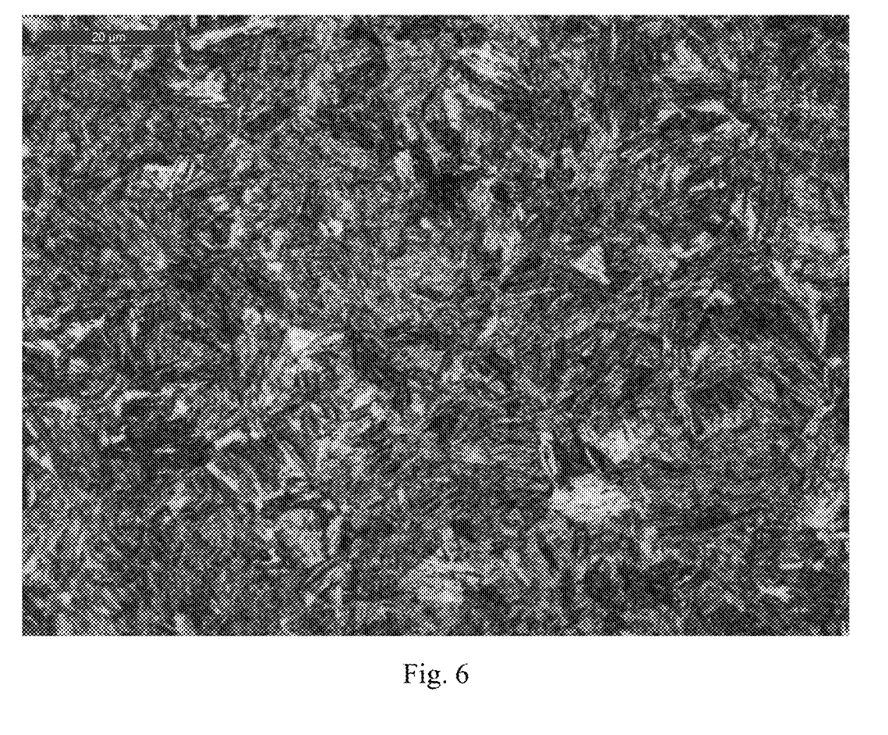
FIG. 6 is an image showing a metallographic: structure of a hard steel layer according to Example A2.

FIG. 6 shows the matrix structure of the hard steel layers in Example A2. As can be seen from FIG. 6, the matrix structure of the hard steel layers is mainly martensite.

It is to be noted that there are listed above only specific examples of the invention. Obviously, the invention is not limited to the above examples. Instead, there exist many similar variations. All variations derived or envisioned directly from the disclosure of the invention by those skilled in the art should be all included in the protection scope of the invention.

What is claimed is:

1. A protective clad steel plate, comprising: hard and soft steel layers arranged alternately, wherein face layers of the protective clad steel plate are hard steel layers, wherein the hard steel layer and the soft steel layer are atomically bonded by rolling cladding; wherein the soft steel layer consists of chemical elements in percentage by mass of:

C: 0.001-0.01%, O<Si≤0.005%, Mn: 0.05-0.15%, 0<Al≤005%, Ti: 0.01-0.10%, with a balance of Fe and unavoidable impurities, and wherein the hard steel layer consists of chemical elements in percentages by mass of:

C: 0.40-0.50%, Si: 0.1-0.3%, Mn: 1.0-1.5%, Al: 0.01-0.05%, Cr: 0.1-0.3%, Ni: 0.1-0.3%, Ti: 0.01-0.03%, B: 0.001-0.003%, Mo: 0.05-0.5%, and a balance of Fe and unavoidable impurities;

wherein the soft steel layer has a hardness of no more than 90 Hv, and the hard steel layer has a hardness of greater than 600 HBW.

2. The protective clad steel plate according to claim 1, wherein the soft steel layer has a matrix structure of equiaxed ferrite.

3. The protective clad steel plate according to claim 2, wherein the equiaxed ferrite has a grain size of 40-120 μm.

4. The protective clad steel plate according to claim 3, wherein the soft steel layer has a yield strength of 80-180 MPa and an elongation rate of greater than 40%.

5. The protective clad steel plate according to claim 1, wherein the hard steel layer has a matrix structure of martensite.

6. The protective clad steel plate according to claim 5, wherein the hard steel layer has a yield strength of greater than 2000 MPa.

7. The protective clad steel plate according to claim 1, wherein the protective clad steel plate comprises two hard steel layers positioned as face layers and a soft steel layer positioned between the two hard steel layers.

8. The protective clad steel plate according to claim 1, wherein the protective clad steel further comprises at least two of the soft steel layers.

9. The protective clad steel plate according to claim 1, wherein the protective clad steel plate has a thickness of 2-20 mm.

10. A manufacture method for making the protective clad steel plate according to claim 1, comprising steps:

(1) assembling hard and soft steel layer billets;

(2) vacuum welding;

(3) clad rolling;

(4) post-rolling air cooling or water cooling;

(5) coiling;

(6) uncoiling, straightening and plate cutting;

(7) quenching-tempering heat treatment.

11. The manufacture method according to claim 10, wherein in step (1), the soft steel layer billet and the hard steel layer billet have a single layer thickness ratio of 0.5-0.8, and a total thickness of the soft steel layer billets and a total thickness of the hard steel layer billets have a ratio of 0.15-0.40.

12. The manufacture method according to claim 10, wherein in step (3), heating is performed at a temperature in the range of 1100-1200° C., wherein the temperature is held for 2-3 h, and then the clad rolling is performed with a final rolling temperature being controlled at 850-900° C.

13. The manufacture method according to claim 10, wherein in step (4), the post-rolling air cooling or water cooling is performed to arrive at 650-750° C.

14. The manufacture method according to claim 10, wherein in a quenching substep in step (7), a quenching temperature is at least 50° C. above an Ac3 temperature of the hard steel layer; a soaking time is at least 3 min/mm×a clad steel plate thickness in mm; and then the plate is cooled to room temperature at a rate of 50° C./s.

15. The manufacture method according to claim 10, wherein in a tempering substep in step (7), a tempering temperature is 150-230° C., and the temperature is held for 15-60 min.

16. The manufacture method according to claim 14, wherein in a tempering substep in step (7), a tempering temperature is 150-230° C., and the temperature is held for 15-60 min.

* * * * *